United States Patent
Birke et al.

(10) Patent No.: US 9,712,451 B2
(45) Date of Patent: *Jul. 18, 2017

(54) NETWORK CONGESTION NOTIFICATION PRESERVATION AND MODIFICATION DURING TRANSMISSION OF NETWORK DATA BETWEEN PHYSICAL NETWORK AND VIRTUAL NETWORK

(71) Applicant: International Business Machines Corporation, Armonk, NY (US)

(72) Inventors: Robert Birke, Kilchberg (CH); Daniel Crisan, Zug (CH); Casimer M. DeCusatis, Poughkeepsie, NY (US); Mircea Gusat, Langnau (CH); Cyriel J. Minkenberg, Gutenswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/681,858

(22) Filed: Apr. 8, 2015

(65) Prior Publication Data

US 2017/0012886 A1    Jan. 12, 2017

Related U.S. Application Data

(63) Continuation of application No. 13/829,570, filed on Mar. 14, 2013, now Pat. No. 9,166,923, which is a
(Continued)

(51) Int. Cl.
*H04L 12/801* (2013.01)
*H04L 12/24* (2006.01)
(Continued)

(52) U.S. Cl.
CPC .............. *H04L 47/33* (2013.01); *H04L 41/00* (2013.01); *H04L 43/0876* (2013.01);
(Continued)

(58) Field of Classification Search
CPC ......... H04L 47/33; H04L 47/12; H04L 47/11; H04L 41/00; H04L 47/26; H04L 43/0876; H04L 43/0882; H04L 47/115
See application file for complete search history.

(56) References Cited

U.S. PATENT DOCUMENTS 6,160,793 A * 12/2000 Ghani ................ H04L 12/5601
370/236
6,333,917 B1   12/2001 Lyon et al.
(Continued)

FOREIGN PATENT DOCUMENTS

JP         2011061699 A      3/2011

OTHER PUBLICATIONS

Non-final office action for U.S. Appl. No. 13/485,705 dated Mar. 28, 2014, 24 pp.
(Continued)

*Primary Examiner* — Ajay Cattungal
(74) *Attorney, Agent, or Firm* — Schmeiser, Olsen & Watts, LLP; Isaac J. Gooshaw

(57) ABSTRACT

A virtual network is implemented on a physical network. A virtual network data packet is tunneled through the physical network via encapsulation within a physical network data packet and via transmission of the physical network data packet through the physical network. A network congestion notification capability of the virtual network is preserved and modified during transmission of virtual network data through the physical network and vice-versa. Congestion notification metadata can be copied from a header of a virtual network data packet to a header of a physical network data packet when the virtual network data packet is encapsulated into the physical network data packet. Congestion notification metadata can be copied from a header of a physical network data packet to a header of a virtual network
(Continued)

data packet when the virtual network data packet is decapsulated from the physical network data packet.

18 Claims, 6 Drawing Sheets

Related U.S. Application Data continuation of application No. 13/485,705, filed on May 31, 2012, now Pat. No. 9,112,804.

(51) Int. Cl.
 H04L 12/825 (2013.01)
 H04L 12/26 (2006.01)
(52) U.S. Cl.
 CPC .......... H04L 43/0882 (2013.01); H04L 47/11 (2013.01); H04L 47/115 (2013.01); H04L 47/12 (2013.01); H04L 47/26 (2013.01)

(56) References Cited

U.S. PATENT DOCUMENTS

| | | | |
|---|---|---|---|
| 6,473,798 B1 | 10/2002 | Grosser et al. | |
| 7,069,356 B2 | 6/2006 | Meyer et al. | |
| 7,149,187 B1 | 12/2006 | Jacobson et al. | |
| 8,457,138 B1* | 6/2013 | Boling | H04L 47/2491 370/230 |
| 2002/0160811 A1* | 10/2002 | Jannette | H04L 47/10 455/560 |
| 2008/0259959 A1* | 10/2008 | Zhai | H04L 12/4645 370/474 |
| 2009/0034416 A1 | 2/2009 | Baron et al. | |
| 2010/0128605 A1* | 5/2010 | Chavan | H04L 47/10 370/230.1 |
| 2010/0142539 A1* | 6/2010 | Gooch | H04L 47/10 370/400 |
| 2011/0182194 A1* | 7/2011 | Jacquet | H04L 12/2602 370/252 |
| 2011/0205895 A1 | 8/2011 | Chen et al. | |
| 2011/0317559 A1* | 12/2011 | Kern | H04L 45/02 370/235 |
| 2012/0051216 A1* | 3/2012 | Zhang | H04L 47/12 370/230 |
| 2012/0063303 A1 | 3/2012 | Gnanasekaran et al. | |
| 2012/0087232 A1 | 4/2012 | Hanabe et al. | |
| 2012/0176893 A1* | 7/2012 | Ghanwani | H04L 12/4641 370/230 |
| 2012/0257496 A1* | 10/2012 | Lattmann | H04L 45/00 370/229 |
| 2013/0088997 A1* | 4/2013 | Briscoe | H04L 47/10 370/252 |
| 2013/0117847 A1* | 5/2013 | Friedman | H04L 63/102 726/22 |
| 2013/0259465 A1* | 10/2013 | Blair | H04B 10/27 398/2 |
| 2013/0322237 A1 | 12/2013 | DeCusatis et al. | |
| 2013/0322252 A1 | 12/2013 | DeCusatis et al. | |

OTHER PUBLICATIONS

Final office action for U.S. Appl. No. 13/485,705 dated Oct. 23, 2014, 24 pp.
Notice of allowance for U.S. Appl. No. 13/485,705 dated Jan. 9, 2015, 11 pp.
Non-final office action for U.S. Appl. No. 13/829,570 dated Mar. 28, 2014, 12 pp.
Notice of allowance for U.S. Appl. No. 13/829,570 dated Nov. 6, 2014, 9 pp.
Greene, K. "TR10: Software-Defined Networking", Mar. 2009, MIT Technology Review, 2 pp.
Ramakrishnan, K., "A proposal to add explicit congestion notification (ECN) to IP (RFC2481)", Jan. 1, 1999.
Floyd, S., "Specifying new congestion control algorithms (RFC5033)", Aug. 1, 2007.
Welzl, M., Congestion control in the RFC series (RFC5783), Feb. 1, 2010.

* cited by examiner

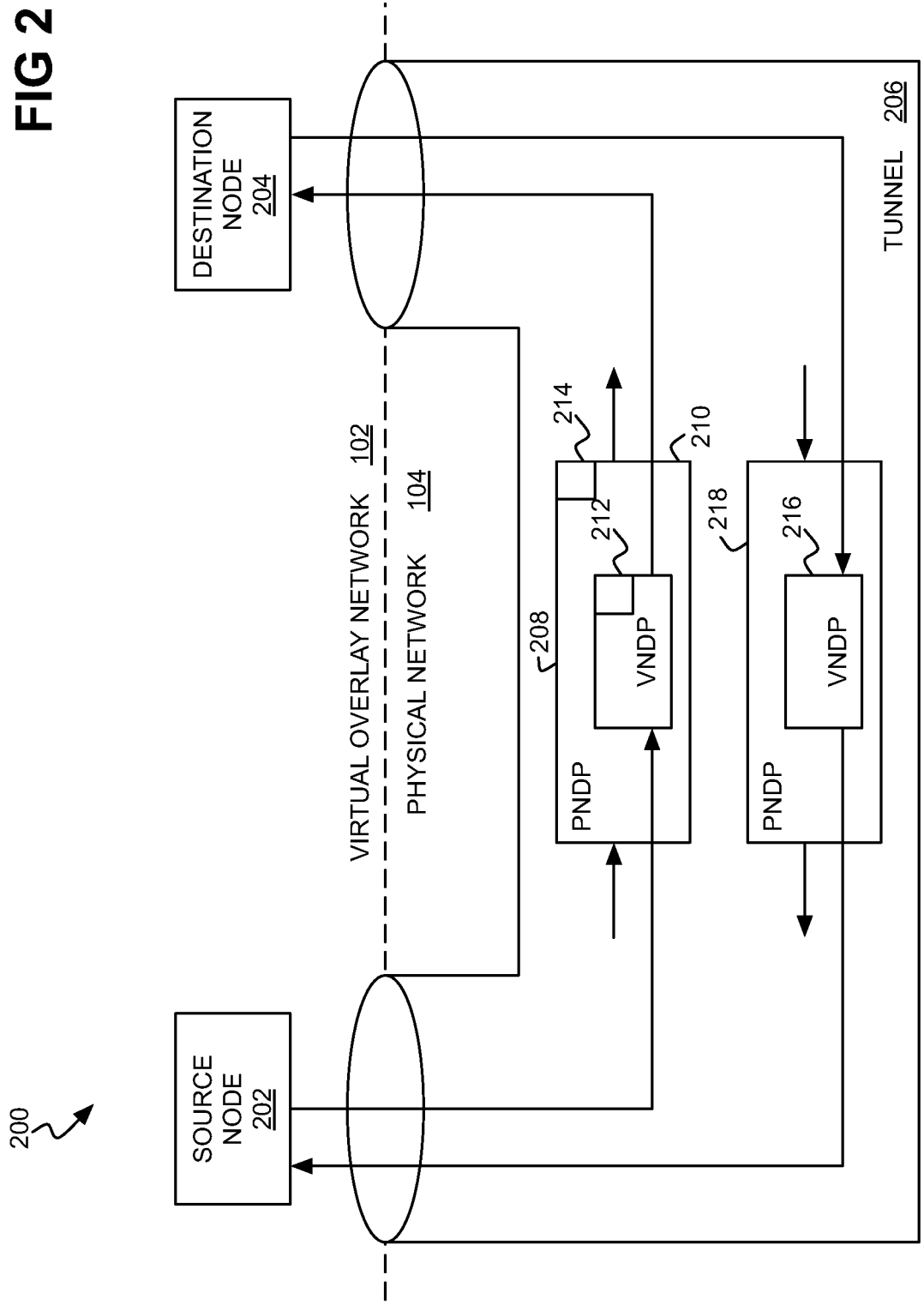

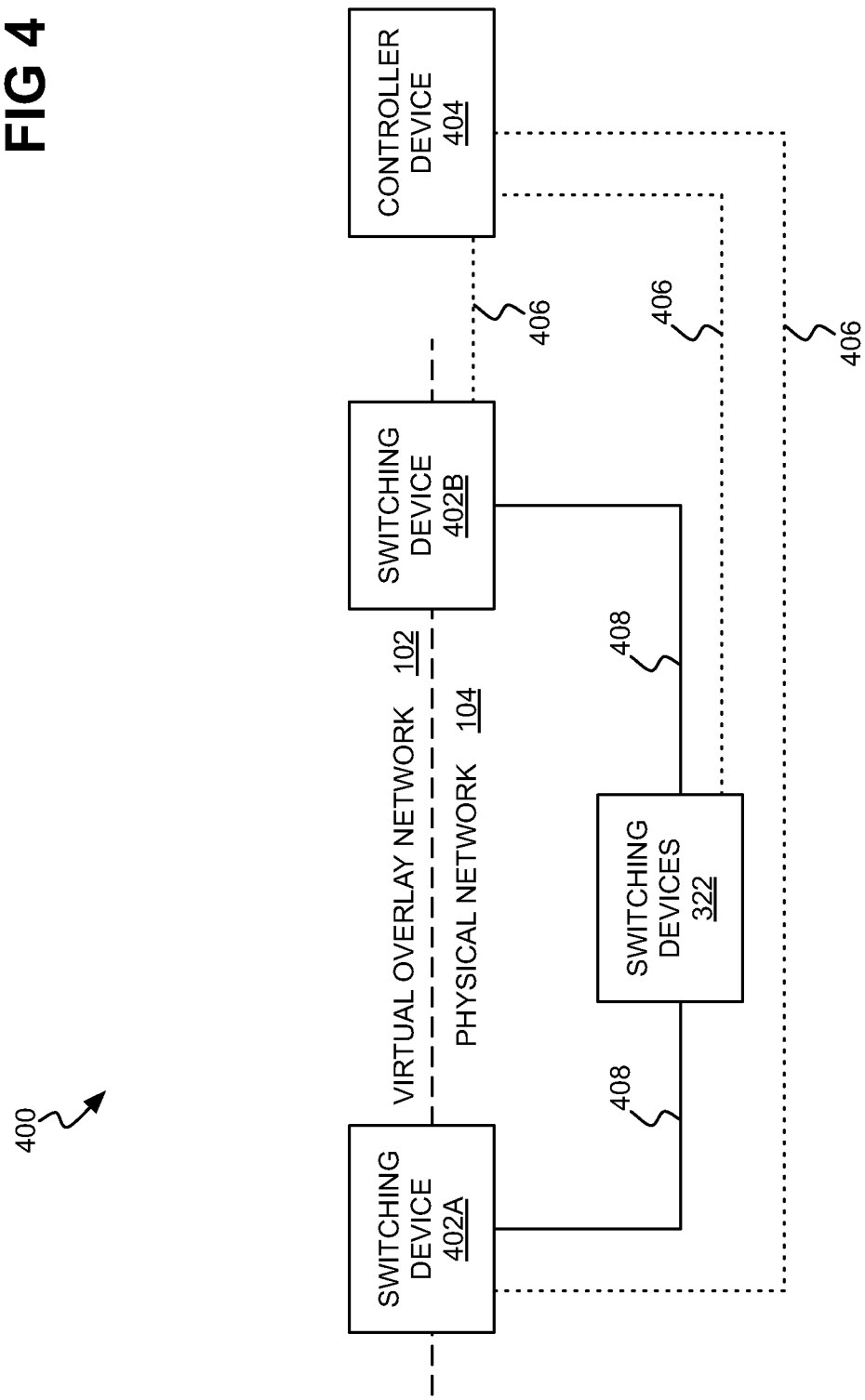

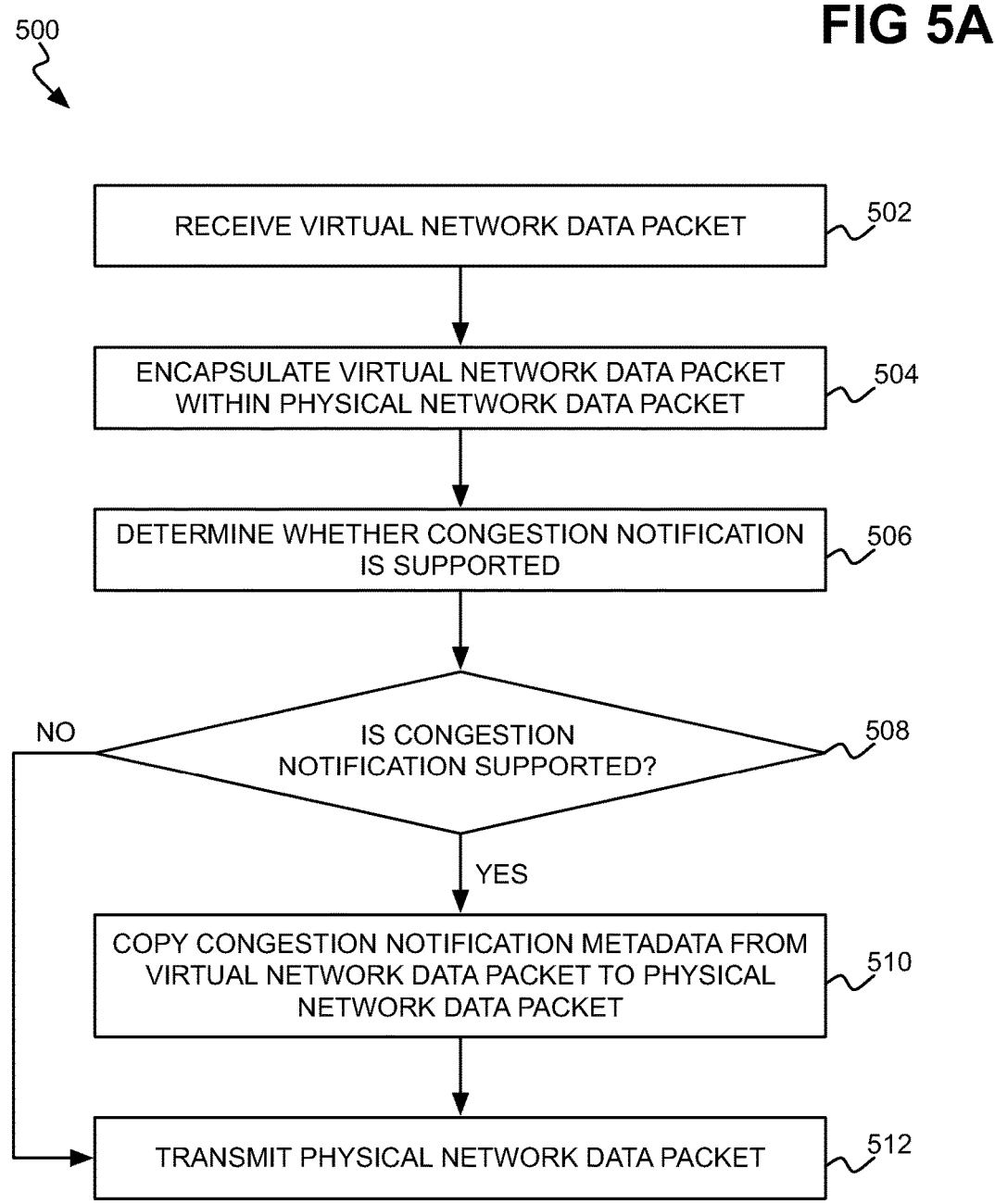

NETWORK CONGESTION NOTIFICATION PRESERVATION AND MODIFICATION DURING TRANSMISSION OF NETWORK DATA BETWEEN PHYSICAL NETWORK AND VIRTUAL NETWORK

This application is a continuation application claiming priority to Ser. No. 13/829,570, filed Mar. 14, 2013, now U.S. Pat. No. 9,166,923, issued Oct. 20, 2015, which is a continuation of Ser. No. 13/485,705, filed May 31, 2012, now U.S. Pat. No. 9,112,804, issued Aug. 18, 2015.

BACKGROUND

A network is a collection of computing-oriented components that are interconnected by communication channels which permit the sharing of resources and information. Traditionally, networks have been physical networks, in which physical computing devices like computers are interconnected to one another through a series of physical network devices like physical switches, routers, hubs, and other types of physical network devices. More recently, particularly with the advent of virtual machine (VM) technologies that virtualize physical computing devices so that a number of such VMs can run on the same physical computing device, virtual networks have become more popular.

Virtual networks permit virtual devices and/or physical devices to communicate with one another over communication channels that are virtualized onto actual physical communication channels. In much the same way as a given physical computing device can support more than one VM, a physical network may support more than one virtual network. The virtual networks are separated from their underlying physical infrastructure and from one another, such as by using a series of virtual network devices like virtual switches, routers, hubs, and so on, which are virtual versions of their physical counterparts. A virtual overlay network in particular is a type of virtual network that is built on top of an underlying physical network.

SUMMARY

A method of an embodiment of the disclosure includes receiving a data packet from a source node of a virtual network intended for a destination node of a virtual network. The data packet is formatted in accordance with a software-defined networking (SDN) protocol. The method includes encapsulating the data packet within a tunneling data packet formatted in accordance with an open systems interconnection (OSI) model protocol. The method includes copying congestion notification metadata from a header of the data packet to a header of the tunneling data packet, and transmitting the tunneling data packet through a physical network on which the virtual network is implemented, towards the destination node of the virtual network. The data packet is tunneled through the physical network from the source node of the virtual network to the destination node of the virtual network via being encapsulated within the tunneling data packet.

A method of another embodiment of the disclosure includes receiving, over a physical network on which a virtual network is implemented, a tunneling data packet formatted in accordance with an open systems interconnection (OSI) model protocol. The method includes decapsulating a data packet that has been encapsulated within the tunneling data packet, the data packet formatted in accordance with a software-defined networking (SDN) protocol and sent from a source node of the virtual network to a destination node of the virtual network. The method includes copying congestion notification metadata from a header of the tunneling data packet to a header of the data packet, and sending the data packet to the destination node of the virtual network. The data packet has been tunneled through the physical network from the source node of the virtual network to the destination of the virtual network via having been encapsulated within the tunneling data packet and transmitted through the physical network on which the virtual network is implemented.

BRIEF DESCRIPTION OF THE SEVERAL VIEWS OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 2 is a diagram of an example scenario in which a network congestion capability is preserved and modified during transmission of virtual overlay network data through a physical network and vice-versa.

FIG. 4 is a diagram of an example system including switching devices that can implement or effect the example scenarios of FIGS. 2 and/or 3.

FIGS. 5A and 5B are flowcharts of example methods by which a network congestion capability can be preserved and modified during transmission of virtual overlay network data through a physical network and vice-versa.

DETAILED DESCRIPTION

Figure 1:
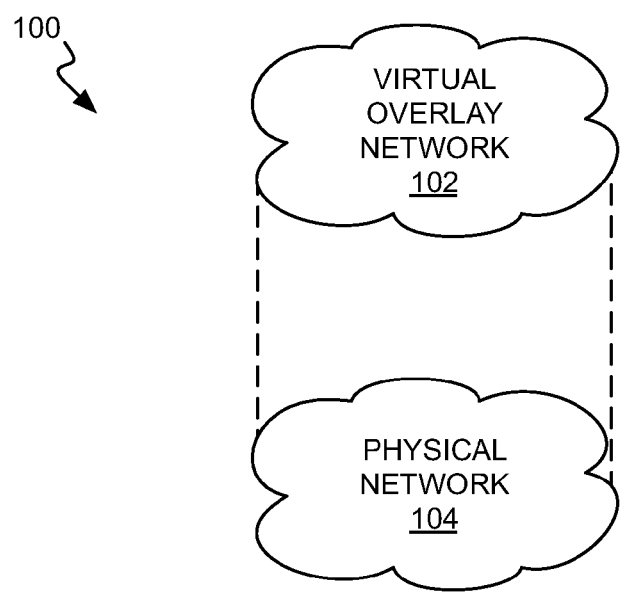
FIG. 1 is a diagram of an example networking topology including a virtual overlay network implemented on an underlying physical network.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, networks are collections of components that are interconnected by communication channels which permit resources and information to be shared. Networks include physical networks and virtual networks. Virtual networks can be implemented as virtual overlay networks that are types of virtual networks built on top of underlying physical networks.

A difficulty with nearly all types of networks is network congestion. Network congestion occurs when a communication channel (or link) or a network component (or node) is carrying so much data that that quality of service suffers. The speed at which the data travels through the network may decrease, and the time for the data to traverse the network from its source to destination may increase. The data may indeed be dropped, and the link or node in question may refuse or block the acceptance of new data.

Different methodologies have been developed to detect network congestion so that the problem can be handled proactively instead of by dropping data. Dropping data is particularly undesirable in the context of lossless networks in which it may be guaranteed that no data is dropped while traversing the network. Methodologies including active queue management (AQM), early congestion notification (ECN), random early detection (RED), and random early marking (REM), among other types of methodologies, have been developed to detect and/or handle network congestion.

Although such methodologies can be implemented in relation to virtual overlay networks and other types of virtual networks, network congestion notification capabilities of these networks are not able to survive during the transmission of virtual overlay network data through the underlying physical networks on which the virtual overlay networks are implemented. As such, the network congestion notification capabilities are essentially rendered useless. For instance, the network congestion notification metadata provided by such capabilities may not be properly used or updated when virtual overlay networks are implemented on underlying physical networks.

For instance, some types of ECN methodologies in particular mark data packets with network congestion notification metadata. When virtual overlay network data packets are encapsulated within physical network data packets for tunneling through an underlying physical network, the network congestion notification metadata is also encapsulated, rendering this metadata hidden and unable to be used. When the virtual overlay network data packets are then decapsulated from the physical network data packets after being tunneled through the underlying physical network, any network congestion notification metadata added to the physical network data packets themselves is stripped away and lost, again rendering this metadata unable to be used.

Techniques disclosed herein provide for the preservation and modification of the network congestion capability of a virtual overlay network during the transmission of virtual overlay network data through a physical network on which a virtual overlay network is implemented, and vice-versa (i.e., preservation and modification of the network congestion capability during transmission of physical network data through the virtual overlay network). For instance, network congestion notification metadata is preserved and modified when encapsulating virtual overlay network data packets within physical network data packets, as well as when decapsulating the virtual overlay network data packets from the physical network data packets. The virtual overlay network data packets are tunneled through the physical network in this example by being encapsulated within the physical network data packets that are transmitted through the physical network. It is noted that although the techniques disclosed herein are described in relation to a virtual overlay network in particular, they are applicable to other types of virtual networks as well.

The preservation and modification capability may be implemented at a switching device, as opposed to at a controller device. When a virtual overlay network data packet is encapsulated within a physical network data packet for tunneling, congestion notification metadata from the header of the virtual overlay network data packet is copied to the physical network data packet prior to transmission over the physical network on which the virtual network has been implemented. When the virtual overlay network data packet is decapsulated from the physical network data packet after such transmission, congestion notification metadata from the physical network data packet is copied back to the virtual overlay network data packet.

In this way, the congestion notification metadata can be preserved and modified across the boundary between the virtual overlay network and the physical network at ingress and egress. At ingress, the metadata may indicate whether the source virtual overlay network node that sent the virtual overlay network data packet in question supports congestion notification. At egress, the metadata may indicate whether the physical network data packet experienced network congestion during transmission through the physical network. By preserving and modifying this metadata, the source and destination virtual overlay network nodes of the virtual overlay network data packet are permitted to communicate with one another in accordance with an established network congestion methodology to manage any congestion that has been encountered.

FIG. 1 shows an example networking topology 100. A virtual overlay network 102 is implemented on an underlying physical network 104. The virtual overlay network 102 is more generally a virtual network, which can be a type of virtual network other than a virtual overlay network. The physical network 104 includes actual physical switching devices, such as hardware like physical switches, routers, hubs, and so on. By comparison, the virtual overlay network 102 does not include any physical switching devices per se. Rather, the virtual overlay network 102 includes virtualized versions of such physical switching devices that can be implemented via actual physical hardware. More than one virtual overlay network 102 may be implemented on the same underlying physical network 104.

The physical network 104 is implemented at a given open systems interconnection (OSI) model layer, or more generally at a networking model layer, such as a level-three model layer like the transmission control protocol/Internet protocol (TCP/IP). As such, the physical network 104 can be a network model layer level-three network like a TCP/IP network. By comparison, the virtual overlay network 102 may be implemented at a networking model layer higher lower that of the physical network, such as a network model layer level-two network.

The virtual overlay network 102 may be a software-defined network through which communication occurs via a software-defined networking protocol (SDN). An SDN protocol differs in at least one respect from a more traditional protocol in that switching devices can be relatively low cost and so-called "dumb" switching devices that do not have much if any built-in routing logic. Instead, the switching devices are programmed and controlled by an external network fabric controller device over a programming path or channel different than the data path, channel, or plane and/or the control path, channel, or plane of the network. An example of an SDN protocol is the OpenFlow protocol maintained by the Open Networking Foundation of Palo Alto, Calif.

The virtual overlay network 102 may more specifically be a software-defined network that is implemented on the physical network 104 using tunneling to encapsulate data of the virtual overlay network 102 through the physical network 104. For instance, a virtual overlay network data packet generated at a source node within the virtual overlay network 102 and intended for a destination node within the virtual overlay network 102 can be encapsulated within a tunneling data packet (i.e., a physical network data packet) that is transmitted through the physical network 104. The virtual overlay network data packet is decapsulated from the tunneling data packet after such transmission for receipt by the destination node.

The virtual overlay network 102 may be a lossless network in which lossless delivery of data without packet dropping is guaranteed even when network congestion is encountered. An example of a lossless network is a lossless Ethernet network. In a lossless network, methodologies are put in place to ensure that data is not lost even if undue network congestion is encountered. At worst, data packets may have their delivery delayed, but are not dropped or otherwise lost.

In this respect, the virtual overlay network 102 can include a network congestion notification capability by which the source and destination nodes of the virtual overlay network 102 interact to ensure that network congestion is properly managed. The capability can be a feedback-based network congestion notification capability in which a destination or target node receiving data from a source node provides feedback to the source node that network congestion has been encountered. Such a network congestion notification capability can be, include, or be based on a variety of different methodologies, including ECN, RED, REM, and AQM methodologies, among others. For instance, such other methodologies can include quantized congestion notification (QCN), forward explicit congestion notification (FECN), and backward explicit congestion notification (BECN). Particular examples of FECN and BECN include those provided in conjunction with or in relation to the InfiniBand Congestion Control Annex (IBA CCA). InfiniBand is a registered trademark of the InfiniBand Trade Association (IBTA), of Beaverton, Oreg.

FIG. 2 shows an example scenario 200 in which the network congestion capability of the virtual overlay network 102 is preserved and modified during transmission of virtual overlay network data through the physical network 104 and vice-versa. The virtual overlay network 102 includes a source node 202 and a destination node 204, which may also be referred to as a target node. The nodes 202 and 204 can each be a virtual node, such as a virtual machine (VMs), or a physical node, like a physical computing device like a computer.

The physical network 104 has defined therein a tunnel 206 through which virtual overlay network data is transmitted between the source node 202 and the destination node 204. As an example, the source node 202 may be streaming multimedia or other data to the destination node 204 over the virtual overlay network 102 implemented on the underlying physical network 104. As such, the source node 202 sends a virtual network data packet 208, which is a virtual overlay network data packet more specifically, to the destination node 204 over the virtual overlay network 102. Because the virtual overlay network 102 is implemented on the physical network 104, the virtual network data packet 208 is in actuality transmitted on the physical network 104, through the tunnel 206.

Specifically, the virtual network data packet 208 is encapsulated within a physical network data packet 210, which may also be referred to as a tunneling data packet, and which is transmitted through the physical network 104. The virtual network data packet 208 is encapsulated within the physical network data packet 210 at point of ingress from the virtual overlay network 102 to the physical network 104 prior to transmission of the physical network data packet 210 through the physical network 104. The virtual network data packet 208 is then decapsulated from the physical network data packet 210 at point of egress from the physical network 104 to the virtual overlay network 102 subsequent to transmission of the physical network data packet 210 through the physical network 104.

The virtual network data packet 208 includes network congestion metadata 212 that may be added by the source node 202 to indicate whether the source node 202 supports congestion notification, such as in accordance with an ECN methodology. The network congestion capability is preserved and modified within the scenario 200 in the first instance in that this network congestion metadata 212 is preserved and modified during transmission of the virtual network data packet 208 through the tunnel 206 of the physical network 104. That is, during translation of data from the virtual overlay network 102 to the physical network 104, the network congestion metadata 212 is preserved and modified. The network congestion metadata 212 is preserved and modified during encapsulation of the virtual network data packet 208 within the physical network data packet 210 at point of ingress into the tunnel 206, as is described in more detail later in the detailed description.

The physical network data packet 210 also includes network congestion metadata 214 that may be added during transmission of the physical network data packet 210 through the physical network 104, such as via a switching device of the physical network 104, to indicate whether the physical network data packet 210 experienced or encountered network congestion during such transmission. The network congestion metadata 214 may be added in accordance with a RED or a REM methodology. The network congestion capability is preserved and modified within the scenario 200 in the second instance in that this network congestion metadata 214 is also preserved and modified during transmission of the virtual network data packet 208 through the tunnel 206 of the physical network 104. That is, during translation of data from the physical network 104 to the virtual overlay network 102, the network congestion metadata 214 is preserved and modified. The network congestion metadata 214 is preserved and modified during decapsulation of the virtual network data packet 208 from the physical network data packet 210 at point of egress from the tunnel 206, as is also described in more detail later in the detailed description.

Upon receiving the virtual network data packet 208, the destination node 204 can thus determine whether the source node 202 supports congestion notification and/or whether network congestion has been encountered during transmission of the virtual network data packet 208 from the source node 202 to the destination node 204. In a feedback-based network congestion notification methodology, the destination node 204 reports back to the source node 202 when network congestion has been encountered, particularly when the source node 202 has presently or earlier indicated that congestion notification is supported. This permits the source node 202 to then, for instance, adjust its outbound data packet queue in accordance with an AQM methodology to guarantee that no data packets from the source node 202 to the destination node 204 will be dropped.

Therefore, the destination node 204 sends a virtual network data packet 216 back to the source node 202 over the virtual overlay network 102, via the tunnel 206 through the physical network 104. The virtual network data packet 216 is considered an echo data packet in that it echoes, or signals, receipt of the virtual network data packet 208 by the destination node 204, and also can include congestion notification-oriented information that the source node 202 can use to ensure lossless data packet delivery. The virtual network data packet 216 is thus itself encapsulated within a physical network data packet 218 at point of ingress into the tunnel 206 at the boundary between the networks 102 and 104, and is decapsulated from the physical network data packet 218 at point of egress from the tunnel 206 at the boundary between the networks 102 and 104.

Figure 3:
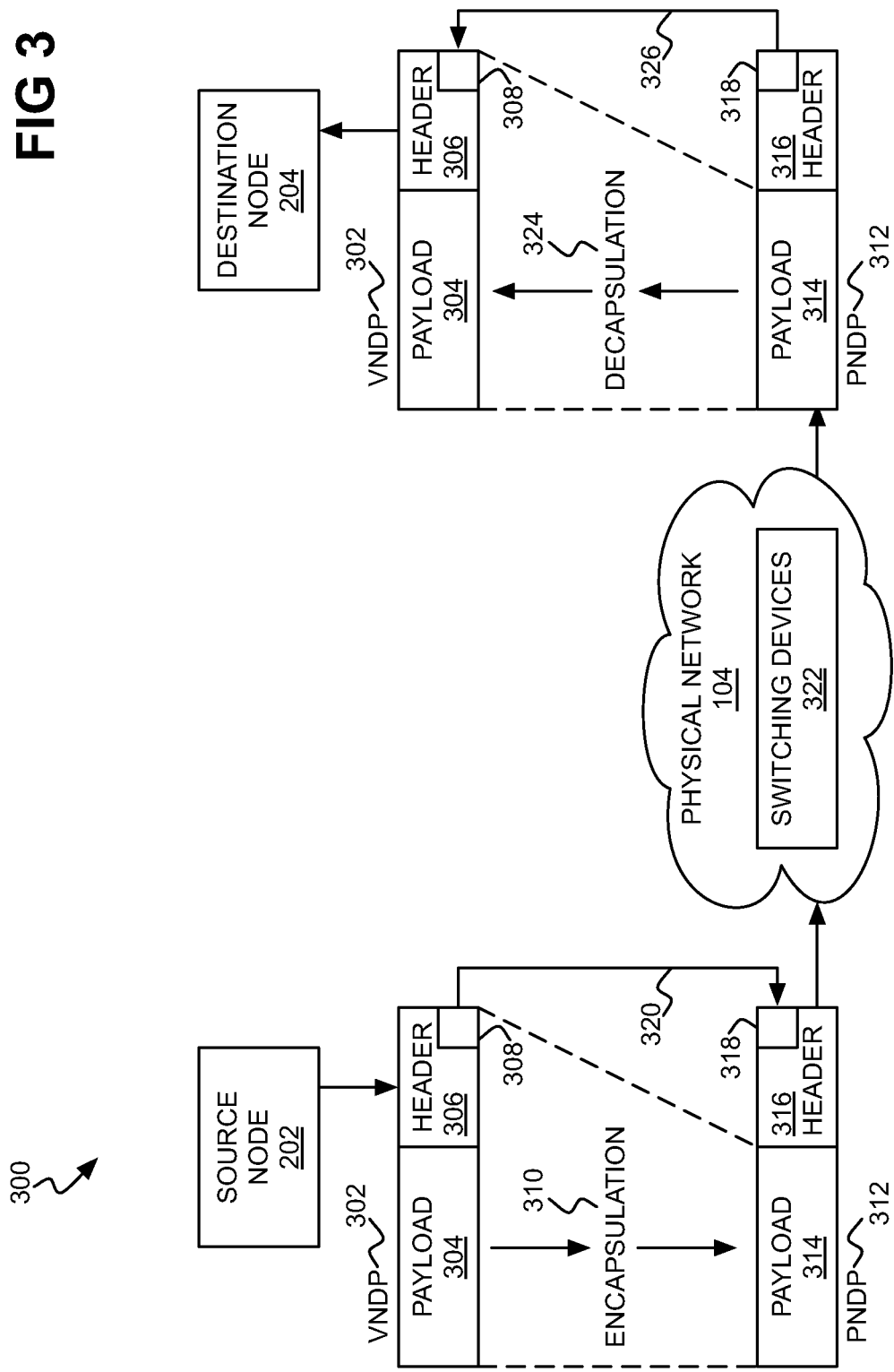
FIG. 3 is a diagram of another example scenario in which a network congestion capability is preserved and modified during transmission of virtual overlay network data through a physical network and vice-versa, which is more detailed than but consistent with the example scenario of FIG. 2.

FIG. 3 shows an example scenario 300 depicting how the network congestion capability of the virtual overlay network 102 can be preserved and modified during transmission of virtual overlay network data through the physical network 104 and vice-versa. The example scenario 300 is more detailed than but consistent with the example scenario 200 that has been described. The virtual overlay network 102 and the tunnel 206 are not specifically called out in FIG. 3 for illustrative clarity and convenience.

A virtual network data packet 302, which may also be referred to as a virtual overlay network data packet 302, includes a payload 304 and a header 306. The header 306 may an IP header, for instance. The header 306 includes network congestion notification metadata 308, such as within one or more bits of the header 306.

The virtual network data packet 302 is encapsulated, which is indicated as encapsulation 310 in FIG. 3, within a physical network data packet 312. Specifically, the virtual network data packet 302 is encapsulated as the payload 314 of the physical network data packet 312. The physical network data packet 312 also includes a header 316, such as an IP header, for instance.

Upon encapsulation 310 of the virtual network data packet 302 into the physical network data packet 312, and prior to transmission of the physical network data packet 312, the congestion notification metadata 308 is copied to network congestion notification metadata 318 of the header 316 of the physical network data packet 312, as indicated by arrow 320. The congestion notification metadata 318 may be one or more bits of the header 316. As such, the bits of the header 306 making up the congestion notification metadata 308 within the virtual network data packet 302 are copied to the corresponding bits of the header 316 making up the congestion notification metadata 318 within the physical network data packet 312.

The physical network data packet 312 is then transmitted through the physical network 104. The physical network 104 particularly includes one or more physical switching devices 322, which can be switches, routers, hubs, and so on. The physical network data packet 312 is transmitted through the physical network 104 via being routed by various of the physical switching devices 322. When the physical network data packet 312 exits the physical network 104, the virtual network data packet 302 is decapsulated from the physical network data packet 312, which is indicated as decapsulation 324 in FIG. 3.

Specifically, the virtual network data packet 302 is decapsulated from or as the payload of the physical network data packet 312. Upon such decapsulation 324, and thus subsequent to transmission of the physical network data packet 312 through the physical network 104, the congestion notification metadata 318 is copied to the congestion notification metadata 308 of the virtual network data packet 302, as indicated by arrow 326. As before, where the congestion notification metadata 308 and 318 are each one or more bits of their respective headers 316 and 306, the bits of the header 316 making up the congestion notification metadata 318 within the physical network data packet 312 are copied to the corresponding bits of the header 306 making up the congestion notification metadata 308 within the virtual network data packet 302.

Two examples serve to illustrate how this mapping of congestion notification metadata 308 and 318 between the virtual network data packet 302 and the physical network data packet 312 preserves and modifies the network congestion capability of the virtual overlay network 102 and vice-versa. First, assume that there is not yet congestion within the physical network 104, but that the source node 202 sending the virtual network data packet 302 supports congestion notification and management, such as in accordance with ECN and/or AQM. The congestion notification metadata 308 is set to indicate this, and the metadata 308 is preserved and modified during transmission of the physical network data packet 312 through the physical network 104.

Specifically, the congestion notification metadata 308 of the virtual network data packet 302 is copied or mapped to the congestion notification metadata 318 of the physical network data packet 312 upon encapsulation 310 of the data packet 302 into the data packet 312. This latter congestion notification metadata 318 does not change and is not modified during transmission of the physical network data packet 312 through the physical network 104, and is copied back to the congestion notification metadata 308 of the virtual network data packet 302 upon decapsulation 324 of the data packet 302 from the data packet 312. As such, the destination node 204 learns that the source node 202 has such support when the destination node 204 receives the virtual network data packet 302.

Second, assume thereafter that network congestion has occurred within the physical network 104, and has been detected such as in accordance with RED. During transmission of another physical network data packet 312 through the physical network 104 after encapsulation 310 of another virtual network data packet 302 therein, a switching device 322 updates, modifies, or marks the congestion notification metadata 318 of the physical network data packet 312, such as in accordance with REM, to indicate that such network congestion has occurred. Upon decapsulation 324 of the virtual network data packet 302 from the physical network data packet 312, this updated, modified, or marked congestion notification metadata 318 is copied to the congestion notification metadata 308 of the virtual network data packet 302.

As such, the destination node 204 learns that during transmission of the virtual network data packet 302 from the source node 202 (via being tunneled through the physical network 104), network congestion occurred. Therefore, the destination node 204 can send an appropriate echo virtual network data packet back to the source node 202 to inform the source node 202 that congestion management should commence, such as in accordance with AQM. These two examples thus show how network congestion capability of the virtual overlay network 102 is preserved and modified during transmission of virtual overlay network data through the physical network 104, via mapping of the congestion notification metadata 308 of the virtual network data packet 302 to the congestion notification metadata 308 of the physical network data packet 312 and vice-versa.

FIG. 4 shows an example system 400 by which the example scenarios 200 and 300 can be implemented. The system 400 includes the switching devices 322 as well as switching devices 402A and 402B, which are collectively referred to as the switching devices 402. Although two switching devices 402 are explicitly shown in FIG. 4, in actuality there are more than two such switching devices 402. The switching devices 402 are, like the switching devices 322, physical switching devices such as physical routers, switches, hubs, and so on. The switching devices 402 differ from the switching devices 322 in that the switching devices 402 are located at the boundary between the virtual overlay network 102 and the physical network 104, whereas the switching devices 322 are internal to and within the physical network 104.

The switching devices 402 perform the encapsulation and the decapsulation that has been described. For instance, the switching device 402A may perform the encapsulation 310 of FIG. 3, whereas the switching device 402B may perform the decapsulation 324. As such, the switching device 402A maps the congestion notification metadata 308 of the virtual network data packet 302 to the congestion notification metadata 318 of the physical network data packet 312 to preserve and modify the congestion notification metadata 308 across the boundary between the virtual overlay network 102 and the physical network 104. Similarly, the switching device 402B maps the congestion notification metadata 318 of the data packet 312 to the congestion notification metadata 308 of the data packet 302 to preserve and modify the congestion notification metadata 318 across the boundary between the physical network 104 and the virtual overlay network 102.

By comparison, the switching devices 322 change, mark, or update the congestion notification metadata 318 of the physical network data packet 312 as the data packet 312 traverses the physical network 104. As described above, when network congestion is detected within the physical network 104, such as via RED, a switching device 322 can change, mark, or update the congestion notification metadata 318, such as via REM, to indicate that such congestion has occurred. Thereafter, the switching device 402B maps this updated congestion notification metadata 318 of the physical network data packet 312 to the congestion notification metadata 308 of the virtual network data packet 302, to preserve and modify such congestion notification metadata 318 across the boundary between the physical network 104 and the virtual overlay network 102 as noted above.

Therefore, the switching devices 402 are the mechanism in the system 400 that preserves and modifies the network congestion notification capability of the virtual overlay network 102 during transmission of virtual overlay network data through the physical network 104 and vice-versa. Because the switching devices 402 are physical hardware, the mechanism in this implementation is likewise one or more physical devices. The mechanism can be said to be distributed over more than one switching device 402, or be implemented in whole or in part at one such switching device 402.

It is noted that the switching devices 402 can themselves also perform at least some of the functionality of the switching devices 322, and vice-versa in some situations. For instance, a boundary switching device 402 can be at least partially responsible for routing data through the physical network 104 no differently than an internal switching device 322. In this respect, the switching devices 402 themselves may update congestion notification metadata of physical network data packets as the physical network data packets traverse the physical network 104, to indicate that network congestion has been encountered or experienced.

The system 400 can include a network fabric controller device 404. The controller device 404 can be an OpenFlow controller (OFC) device, or a controller device compatible with another type of SDN protocol. Similarly, the switching devices 322 and/or 402 can be OpenFlow switches or switching devices, or switching devices compatible with another type of SDN protocol. For example, the OpenFlow protocol permits an OpenFlow switch to be completely programmed by an OFC device. An OFC device thus can program OpenFlow switching devices to perform data routing as desired, such as to encapsulate and decapsulate data packets as has been described.

The network fabric controller device 404 does not itself route data through the virtual overlay network 102 or through the physical network 104. Rather, the network fabric controller 404 programs the switching devices 322 and/or 402 to perform such data routing. In this respect, there is a programming path or channel 406 between the controller device 404 and the switching devices 322 and/or 402 by which such programming is achieved. By comparison, a data path or channel 408 intraconnects and/or interconnects the switching devices 322 and 402, and is the data plane on which data is actually routed.

A third channel may also be presented, but which is not depicted in FIG. 4, and which is referred to as a control path, channel, or plane, along which control information regarding the switching devices 322 and/or 402 is transmitted. This control information can include port information, address information, and other types of control information regarding these components. The network fabric controller device 404 may not typically be connected to the control path or channel, but rather a device that is referred to as a fiber channel (FC) or FC over Ethernet (FCoE) channel forwarder (FCF) device is, and which may be communicatively connected to the controller device 404. In one implementation, however, a single device, such as a single server computing device, may include the functionality of such an FCF device and the functionality of the controller device 404. Like the controller device 404, an FCF device does not route the actual data through the network fabric itself.

The various paths or channels may be logical/virtual or physically discrete paths or channels. For example, there may indeed be just single hardware lines interconnecting and/or intraconnecting ports of the switching devices 322 and 402 and ports of the network fabric controller device 404. However, these hardware lines may have the paths or channels virtually or logically overlaid thereon or defined therein. For instance, the programming path or channel 406 may be a secure socket layer (SSL) channel that uses the same hardware lines that the data path or channel 408 uses.

It is noted that implementing the mechanism that preserves and modifies the congestion notification capability as or within the switching devices 402 is considered particularly innovative. This is because the network congestion metadata 308 and 318 is technically control information. Therefore, it would conventionally be executed to have such control information managed by FCF devices, for instance, and not by switching devices, like the switching devices 402, within networks compatible with SDN protocols. Nevertheless, it has been innovatively recognized that providing for such network congestion metadata translation or mapping functionality within the switching devices 402 as opposed to within FCF or other types of devices can result in a higher efficiency network. However, in other implementations it is contemplated providing for this functionality within FCF or other types of devices.

Figure 5B:
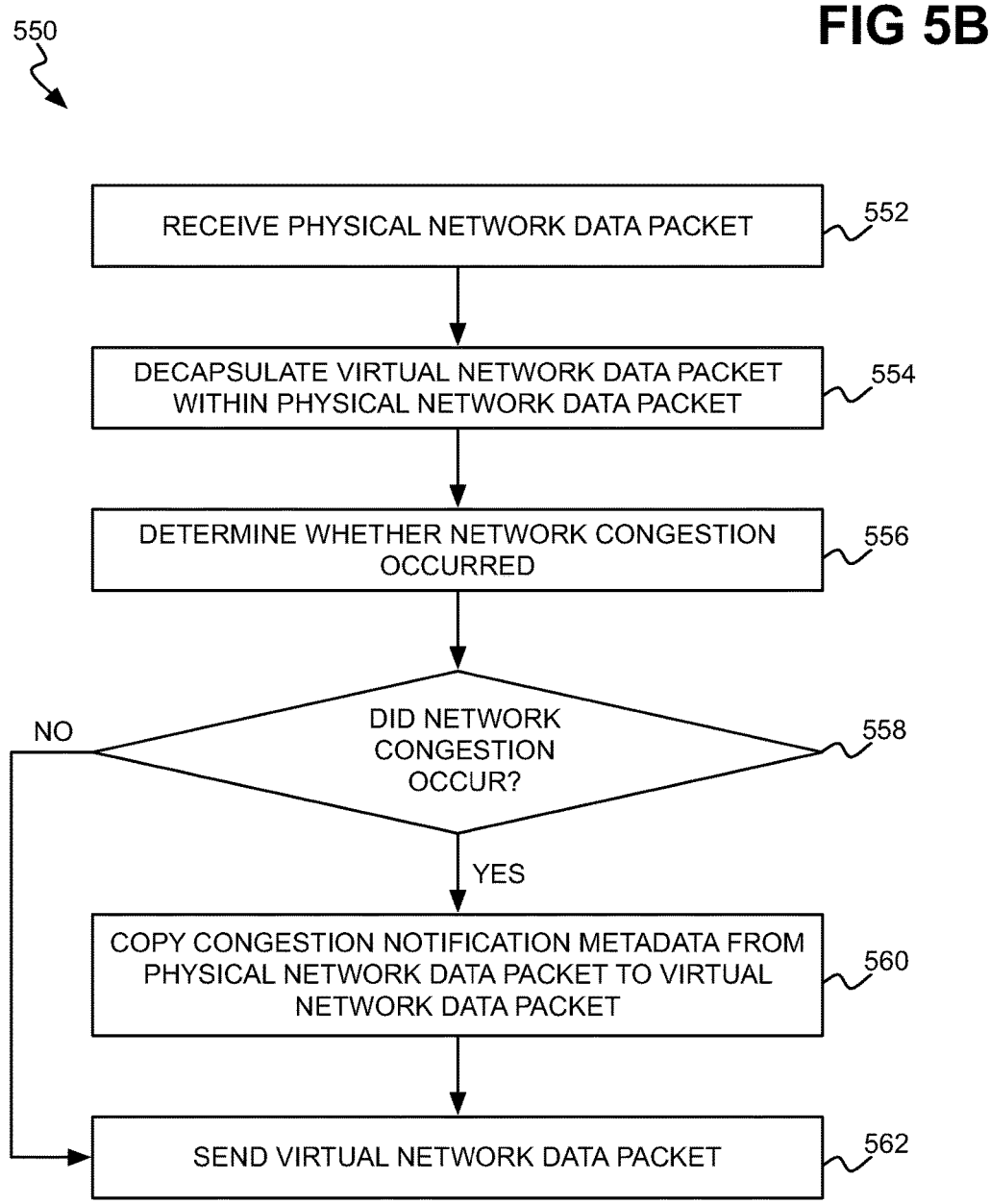

FIGS. 5A and 5B show example methods 500 and 550, respectively. The methods 500 and 550 can be performed by the boundary switching devices 402. The method 500 is performed at ingress into the tunnel 206, such as by the switching device 402A, whereas the method 550 is performed at egress from the tunnel 206, such as by the switching device 402B.

In FIG. 5A, the virtual network data packet 302 is received from the source node 202 (502). The data packet 302 is intended for the destination node 204, and can be formatted in accordance with a SDN protocol like the OpenFlow protocol. The virtual network data packet 302 is encapsulated within the physical network data packet 312 (504). The data packet 312 can be formatted in accordance with an OSI model protocol, such as TCP/IP.

It can be determined whether the source node 202 supports congestion notification (506). For instance, the header 306 of the virtual network data packet 302 can be inspected to determine whether the congestion notification metadata 308 has been added by the source node 202 to indicate that it supports congestion notification. In some implementations of ECN, one of a pair of bits of the header 306 that are normally set to zero are used for this purpose is changed to one in this respect. Therefore, if the bits of the header 306 are not both equal to or set to zero, it can be concluded that the source node 202 supports congestion notification.

If the source node 202 does support congestion notification (508), the congestion notification metadata 308 is copied from the virtual network data packet 302 to the congestion notification metadata 318 of the physical network data packet 312 (510). For instance, the pair of bits of the header 306 of the virtual network data packet 302 that correspond to the congestion notification metadata 308 can be copied to the pair of bits of the header 316 of the physical network data packet 312 that correspond to the congestion notification metadata 318. Note in implementations where part 506 is performed, this means that the congestion notification metadata 308 is copied to the congestion notification metadata 318 only when it has been determined that the source node 202 supports congestion notification.

After part 510 is performed, or from part 508 in the case where the source node 202 does not support congestion notification, the physical network data packet 312 is transmitted over the physical network 104 (514), towards the destination node 204. As such, the virtual network data packet 302 is tunneled through the physical network 104 from the source node 202 to the destination node 204. As described above, this tunneling is achieved via encapsulation 310 of the virtual network data packet 302 within the physical network data packet 312.

In FIG. 5B, the physical network data packet 312 is subsequently received (552). The virtual network data packet 302 is decapsulated from the physical network data packet 312 (554). It can be determined whether network congestion occurred or was detected during transmission of the physical network data packet 312 through the physical network 104 (556).

For instance, the header 316 of the physical network data packet 312 can be inspected to determine whether the congestion notification metadata 318 thereof has been modified (i.e., changed or updated) during transmission of the data packet 312 through the physical network 104. As noted above, a switching device 322 may change the congestion notification metadata 318 as the physical network data packet 312 is routed thereby, when network congestion has been experienced. In some implementations of ECN, a pair of bits of the header 316 that are used for this purpose are both changed to one in this respect. Therefore, if the bits of the header 316 are both equal to or set to one, it can be concluded that network congestion has been experienced.

If network congestion did occur (558), the congestion notification metadata 318 is copied from the physical network data packet 312 to the congestion notification metadata 308 of the virtual network data packet 302 (560). For instance, the pair of bits of the header 316 of the physical network data packet 312 that correspond to the congestion notification metadata 318 can be copied to the pair of bits of the header 306 of the virtual network data packet 302 that correspond to the congestion notification metadata 308. Note in implementations where part 556 is performed, this means that the congestion notification metadata 318 is copied to the congestion notification metadata 308 only where it has been determined that network congestion has been experienced.

After part 560 is performed, or from part 558 in the case where network congestion has not occurred, the virtual network data packet 302 is sent to the destination node 204 of the virtual overlay network 102 (562). It is noted that in the methods 500 and 550, copying of the congestion notification metadata 308 and 318 in parts 510 and 560 selectively, based on the results of the determination of parts 506 and 556, can improve overall network performance. That is, the congestion notification metadata 308 and 318 are not always copied in implementations in which parts 506 and 556 are performed, decreasing the number of times such copy operations are performed.

Figure 6:
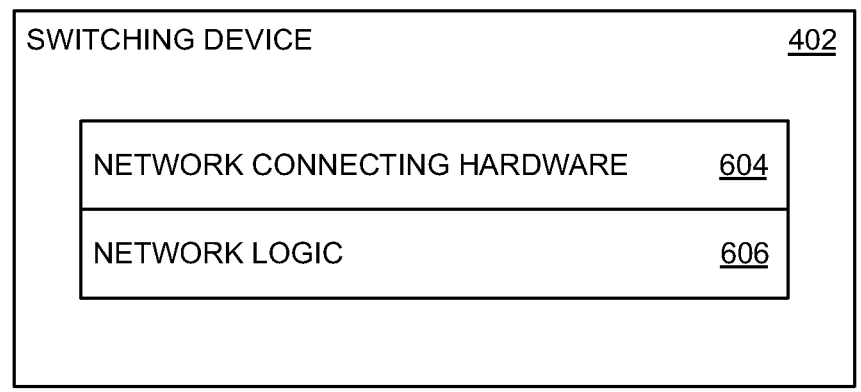
FIG. 6 is a diagram of an example switching device that can implement or effect the example scenarios of FIGS. 2 and/or 3.

FIG. 6 shows an example implementation of a switching device 402. The switching device 402 includes network connecting hardware 604 and network logic 606. The switching device 402 can also include other components, in addition to the network connecting hardware 604 and/or the network logic 606. The network connecting hardware 604 is hardware that connects the switching device 402 to the physical network 104 on which the virtual overlay network 102 has been implemented.

The network logic 606 may be implemented as software, hardware, or a combination of software and hardware. As one example, the network logic 606 may be a computer program stored on a computer-readable data storage medium and executable by a processor. As another example, the network logic 606 may be implemented as hardware, such as an application-specific integrated circuit (ASIC), a field-programmable gate array (FPGA), and so on.

The network logic 606 performs the encapsulation 310, decapsulation 324, and/or network congestion notification metadata 308 and 318 mapping that has been described. For instance, as to the switching device 402A, the network logic 606 can perform the method 500. Similarly, as to the switching device 402B, the network logic can perform the method 550. In general, the network logic 606 preserves and modifies the congestion notification metadata 308 and 318 when encapsulating virtual overlay network data packets, such as the data packet 302, within physical network data packets, such as the data packet 312, and when decapsulating the former packets from the latter packets.

It is noted that the techniques disclosed herein are applicable to preserving and modifying other types of capabilities and information between virtual networks, like virtual overlay networks, and physical networks. In physical networks, such as those implementing the converged enhanced Ethernet (CEE) protocol and other types of data center bridging (DCB) protocols, flow control like priority flow control (PFC) can be employed to ensure that such networks have lossless characteristics and properties. Similarly, in virtual networks, virtual flow control (VFC) can be employed. As such, techniques disclosed herein can preserve and modify the lossless characteristics and properties between physical networks and virtual networks, by, for instance, ensuring that PFC information is properly translated to VFC information, and vice-versa. As such, a feedback or backpressure mechanism is employed across the physical and virtual networks to maintain lossless characteristics and properties of these networks.

It is noted that, as can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A system comprising:
    a software-defined networking (SDN) switching device connected to a data channel of an SDN virtual network implemented on a physical network and not to a control channel of the virtual network to communicate data over the virtual network, the SDN switching device having a mechanism to preserve and modify a network congestion notification capability of the virtual network during transmission of virtual network data through the physical network and vice-versa,
    wherein the congestion notification capability of the virtual network relates to network congestion notification metadata that is communicated over the data channel using the SDN switching device.

2. The system of claim 1, wherein the mechanism maps network congestion notification metadata during translation of data from the virtual network to the physical network and during translation of data from the physical network to the virtual network.

3. The system of claim 1, wherein the network congestion notification capability is a feedback-based network congestion notification capability in which a target node receiving data from a source node provides feedback to the source node that network congestion has been encountered.

4. The system of claim 3, wherein the feedback-based network congestion notification capability is an early congestion notification (ECN) notification capability employing one or more of: random early detection (RED), random early marking (REM), active queue management (AQM), quantized congestion notification (QCN), forward explicit congestion notification (FECN), and backward explicit congestion notification (BECN).

5. The system of claim 1, wherein the virtual network is a lossless network in which lossless delivery of data without packet dropping is guaranteed even when network congestion is encountered.

6. The system of claim 1, wherein the virtual network is a software-defined network that is implemented on the physical network using tunneling to encapsulate data of the virtual network through the physical network.

7. The system of claim 1, wherein the physical network is implemented at a networking model layer higher than a network model layer at which the virtual network is implemented.

8. The system of claim 7, wherein the physical network is a network model layer level three network, and the virtual network is a network model layer level two network.

9. The system of claim 8, wherein the physical network is a transmission control protocol/Internet protocol (TCP/IP) network.

10. A switching device for a system including a software-defined networking (SDN) controller device comprising:
    software-defined networking (SDN) network connecting hardware to connect the switching device to a physical network on which an SDN virtual network having at least a data channel and a control channel has been implemented, the SDN controller device of the system connected to the control channel and not the data channel to communicate control information over the virtual network, the SDN network connecting hardware connected to the data channel and not to the control channel to communicate data over the virtual network; and
    logic to preserve and modify network congestion notification metadata when encapsulating virtual network data packets within physical network data packets and when decapsulating the virtual network data packets from the physical network data packets,
    wherein the network congestion notification metadata is communicated over the data channel within the system using the switching device.

11. The switching device of claim 10, wherein the logic comprises logic to copy the network congestion notification metadata from headers of the virtual network data packets to headers of the physical network data packets upon encapsulating the virtual network data packets into the physical network data packets,
    the network congestion notification metadata added by nodes of the virtual network to indicate that the nodes support congestion notification.

12. The switching device of claim 10, wherein the logic comprises logic to copy the network congestion notification metadata from headers of the physical network data packets to headers of the virtual network data packets when decapsulating the virtual network data packets from the physical network data packets,
    the network congestion notification metadata modified during transmission of the tunneling data packets through the physical network to indicate that network congestion was experienced during the transmission.

13. A computer program product comprising:
    a storage device storing computer-readable code executable by a software-defined networking (SDN) switching device of a system, the code comprising:
        computer-readable code to copy first network congestion notification metadata from a header of a first virtual network data packet to a header of a first physical network data packet upon encapsulation of the first virtual network data packet into the first physical network data packet, prior to transmission of the first physical network data packet through a physical network;
        computer-readable code to copy second network congestion notification metadata from a header of a second physical network data packet to a header of a second virtual network data packet upon decapsulation of the second virtual network data packet from the second physical network data packet, subsequent to the transmission of the second physical network data packet through the physical network; and
        computer-readable code to cause the first and second network congestion notification metadata to be communicated are over the data channel within the system.

14. The computer program product of claim 13, wherein the computer-readable code to copy the first network congestion notification metadata comprises code to copy the first network congestion notification metadata only where the first network congestion notification metadata indicates that a node of a virtual network that sent the first virtual network data packet supports congestion notification, wherein the virtual network is implemented on the physical network.

15. The computer program product of claim 13, wherein the computer-readable code to copy the second network congestion notification metadata only where the second network congestion notification metadata indicates that network congestion was experienced during the transmission of the physical network data packet through the physical network.

16. A method comprising:
  copying, by a software-defining networking (SDN) switching device of a system, first network congestion notification metadata from a header of a first virtual network data packet to a header of a first physical network data packet upon encapsulation of the first virtual network data packet into the first physical network data packet, prior to transmission of the first physical network data packet through a physical network, the SDN switching device connected to a data channel of a virtual network implemented on the physical network to communicate data over the virtual network and not connected to a control channel of the virtual network;
  copying, by the SDN switching device, second network congestion notification metadata from a header of a second physical network data packet to a header of a second virtual network data packet upon decapsulation of the second virtual network data packet from the second physical network data packet, subsequent to transmission of the second physical network data packet through the physical network,
  wherein the first and second network congestion metadata are communicated over the data channel within the system using the SDN switching device.

17. The method of claim 16, wherein copying the first network congestion notification metadata comprises copying the first network congestion notification metadata only where the first network congestion notification metadata indicates that a node of the virtual network that sent the first virtual network data packet supports congestion notification.

18. The method of claim 16, wherein copying the second network congestion notification metadata comprises copying the second network congestion notification metadata only where the second network congestion notification metadata indicates that network congestion was experienced during the transmission of the second physical network data packet through the physical network.

* * * * *